(12) United States Patent
Jeon et al.

(10) Patent No.: US 9,290,388 B2
(45) Date of Patent: Mar. 22, 2016

(54) CARBONACEOUS NANOCOMPOSITE HAVING NOVEL STRUCTURE AND FABRICATION METHOD THEREOF

(75) Inventors: Min-Hyon Jeon, Busan (KR);
Hyon-Kwang Choi, Gyeongnam (KR);
Sook-Hyun Hwang, Busan (KR);
Hyun-Kook Kim, Gyeongnam (KR)

(73) Assignee: INJE UNIVERSITY INDUSTRY-ACADEMIC COOPERATION FOUNDATION, Gimhae, Gyungnam (KR)

( * ) Notice: Subject to any disclaimer, the term of this patent is extended or adjusted under 35 U.S.C. 154(b) by 429 days.

(21) Appl. No.: 13/388,777

(22) PCT Filed: May 20, 2010

(86) PCT No.: PCT/KR2010/003209
§ 371 (c)(1),
(2), (4) Date: Apr. 16, 2012

(87) PCT Pub. No.: WO2011/016616
PCT Pub. Date: Feb. 10, 2011

(65) Prior Publication Data
US 2012/0192931 A1    Aug. 2, 2012

(30) Foreign Application Priority Data

Aug. 3, 2009 (KR) .......................... 10-2009-0071356
Jan. 18, 2010 (KR) .......................... 10-2010-0004279

(51) Int. Cl.
*B32B 9/00* (2006.01)
*C01B 31/04* (2006.01)
(Continued)

(52) U.S. Cl.
CPC .............. *C01B 31/0438* (2013.01); *B82Y 30/00* (2013.01); *B82Y 40/00* (2013.01); *C01B 31/022* (2013.01); *Y10T 428/24* (2015.01)

(58) Field of Classification Search
CPC .............. C01B 31/0438; C01B 31/022; C01B 2204/00; C01B 2200/00
USPC .......................................... 428/408; 423/448
See application file for complete search history.

(56) References Cited

U.S. PATENT DOCUMENTS

| 8,709,373 | B2 * | 4/2014 | Hauge et al. ................ 423/447.1 |
| 2004/0071870 | A1 * | 4/2004 | Knowles et al. .............. 427/200 |

(Continued)

FOREIGN PATENT DOCUMENTS

WO    WO 2007/136613 A2    11/2007

OTHER PUBLICATIONS

Yang et al. "Low-Temperature Solution Processing of Graphene—Carbon Nanotube Hybrid Materials for High-Performance Transparent Conductors", Nano Letters, v9, n5, 2009.*

(Continued)

*Primary Examiner* — Daniel H Miller
(74) *Attorney, Agent, or Firm* — Novick, Kim & Lee, PLLC; Jae Youn Kim

(57) ABSTRACT

Disclosed is a carbonaceous nanocomposite including: a substrate; a graphene sheet formed on a top surface of the substrate in parallel with the substrate; and a carbonaceous nanomaterial provided on another surface of the graphene sheet, the nanomaterial having an aspect ratio of 2 to 75,000 to make a predetermined angle with the graphene sheet. The carbonaceous nanocomposite according to the present disclosure has excellent adhesivity to the substrate and can be attached to the substrate without undergoing a pasting process. Since a two-directional current flow is generated, the electrical resistance of the graphene and carbon nanotube is considerably reduced. In addition, the graphene allows the carbon nanotube to have a high current density and a high specific surface area, thereby accelerating a redox reaction. The excellent heat-radiating property of the graphene sheet allows fast transfer of heat generated in the carbon nanotube to outside, thereby avoiding degradation of the carbon nanotube. Thus, when employed as an electrode for a battery or a field emission display, a higher current density and an extended lifespan can be achieved when compared with the existing art.

17 Claims, 8 Drawing Sheets

(51) Int. Cl.
  *B82Y 30/00*  (2011.01)
  *B82Y 40/00*  (2011.01)
  *C01B 31/02*  (2006.01)

(56) References Cited

U.S. PATENT DOCUMENTS

2007/0102111 A1   5/2007  Monsma et al.
2007/0284557 A1*  12/2007 Gruner et al. ................. 252/500
2009/0169919 A1*  7/2009  Garcia et al. ................. 428/688

OTHER PUBLICATIONS

International Search Report for International Application No. PCT/KR2010/003209, mailed Feb. 1, 2011.
Li, X., et al.; "Large-area synthesis of high quality and uniform graphene films on copper foils"; Science; vol. 324; pp. 1312-1314; Jun. 2009; See abstract.
Liu, X., et al.; "Direct growth of vertically aligned carbon nanotubes on a planar carbon substrate by thermal chemical vapour deposition"; Carbon; vol. 47; Feb. 2009; pp. 500-506.

* cited by examiner (a)

(b)

(a)

(b)

(a)

(b)

CARBONACEOUS NANOCOMPOSITE HAVING NOVEL STRUCTURE AND FABRICATION METHOD THEREOF

CROSS REFERENCE TO RELATED APPLICATIONS

This application is a national stage application filed under 35 U.S.C. 371 of International Application No. PCT/KR2010/003209, filed May 20, 2010, which claims priority to Korean Application No. 10-2009-0071356, filed Aug. 3, 2009, and Korean Application No. 10-2010-0004279, filed Jan. 18, 2010, each of which is incorporated herein in its entirety.

TECHNICAL FIELD

The present disclosure relates to a carbonaceous nanocomposite having a novel structure, a method for fabricating the same, and an electrode for a battery and a field emission display using the carbonaceous nanocomposite. More particularly, the present disclosure relates to a carbonaceous nanocomposite having a novel structure capable of providing good adhesion to a substrate and extending device lifespan by reducing electrical resistance, a method for fabricating the same, and an electrode for a battery and a field emission display using the carbonaceous nanocomposite.

BACKGROUND ART

In general, carbon nanotube is widely used in various fields where carbonaceous nanomaterials are used. Carbon nanotube is an extremely fine cylindrical material with a very small diameter of several nanometers (nm). In the carbon nanotube, each carbon atom is bonded to three others carbon atoms, forming a hexagonal honeycomb structure. The carbon nanotube can be conducting or semiconducting depending on its structure and is expected to be widely applicable in various technical fields.

It is to utilize the advantages of the carbon nanotube over other existing materials, including high electrical conductivity and mechanical strength, fast redox reaction, excellent electron-emitting effect, superior cost competitiveness, or the like.

For growth of the carbonaceous nanomaterials including the carbon nanotube, various methods are reported, including arc discharge, laser vapor deposition, chemical vapor deposition (CVD), plasma-enhanced chemical vapor deposition, or the like.

In arc discharge, graphite rods with different diameters are disposed in a vacuum chamber as an anode and a cathode to be spaced from each other and electrical discharge is induced. Carbon nanotube is formed on the outer surface of the chamber at the anode side. However, this method is not suitable for mass production and large amounts of impurities such as amorphous carbon or metal powder are formed. Thus, an additional purification process is necessary and the control of thickness and length of the carbon nanotube is not easy.

Laser vapor deposition synthesizes carbon nanotube via evaporation by irradiating laser to a graphite rod. Like the arc discharge method, this method is not suitable for mass production because the yield is extremely low.

In chemical vapor deposition, carbon nanotube is grown while flowing a carbon-containing precursor material into a high-temperature furnace. Although being advantageous for mass production, the method requires use of a catalyst and a high-temperature heat of 600-1000° C. Thus, a lot of efforts are required to remove the catalyst and glass or plastic substrates are inapplicable to the high-temperature process.

In plasma-enhanced chemical vapor deposition, a catalytic metal film is formed on a substrate and the catalytic metal film is etched using a plasma generated from an etching gas to form plural catalytic particles. Then, carbon nanotube is synthesized on the catalytic particles while supplying a carbon source gas to the plural catalytic particles formed on the substrate.

In the field emission display used for displaying and medical imaging, there has been an attempt to form carbon nanotube with high current density per unit area on a catalytic metal film formed on a semiconductor substrate to achieve high electron-emitting effect.

To utilize the grown carbonaceous nanomaterial, it needs to be attached to or deposited on the substrate of a device. The attachment may be achieved via direct growth on the substrate, for example, by chemical vapor deposition or via direct growth on another substrate and then transfer to the desired substrate. The adhesivity of the carbonaceous nanomaterial (e.g. graphene, carbon nanotube, carbon nanofiber, etc.) with the substrate depends on the van der Waals force which is in proportion to the area of contact. Since the existing carbon nanotube and carbon nanofiber have small diameters of several to hundreds of nanometers, the adhesivity to the substrate is very weak. As a consequence, operation time is short and degradation occurs easily.

To overcome this problem, a process of removing the grown material from the substrate, preparing it into a slurry and then attaching on a device substrate may be utilized. To the slurry, a binder is added to improve adhesion with the substrate. The slurry is changed into a thin film after being attached to the substrate following drying and baking. However, the thin film resulting from the attachment process has very poor electrical conductivity and other electrical properties as compared to direct growth owing to residual carbon resulting from the insulating binder material.

When carbon nanotube is used, electrical properties are degraded rapidly because of random horizontal arrangement during the preparation of the slurry in addition to the binder problem. Due to these disadvantages, desired efficiency, brightness, or the like expected from the theoretical calculation cannot be achieved. In addition, the carbonaceous nanomaterial is problematic in that device lifespan is reduced because of the heat generated during operation of the device.

DISCLOSURE

Technical Problem

The present disclosure is directed to providing a carbonaceous nanocomposite having a novel 2-dimensional planar structure in order to solve the problems of directly-grown carbon nanotube such as adhesivity problem and binder problem during the attachment process.

The present disclosure is also directed to providing a method for fabricating a carbonaceous nanocomposite having a novel 2-dimensional planar structure in order to solve the problems of directly-grown carbon nanotube such as adhesivity problem and binder problem during the attachment process.

The present disclosure is also directed to providing an electrode for a battery employing a carbonaceous nanocomposite having a novel structure in order to solve the problem of deterioration of electrical properties owing to increased resistance.

The present disclosure is also directed to providing a field emission display employing a carbonaceous nanocomposite having a novel structure in order to solve the problems of attachment to a substrate and reduced device lifespan because of the heat generated during operation of the device.

Technical Solution

In one general aspect, the present disclosure provides a carbonaceous nanocomposite including: a substrate; a graphene sheet formed on a top surface of the substrate in parallel with the substrate; and a carbonaceous nanomaterial provided on another surface of the graphene sheet, the nanomaterial having an aspect ratio of 2 to 75,000 to make a predetermined angle with the graphene sheet.

In another general aspect, the present disclosure provides a method for fabricating a carbonaceous nanocomposite, including: providing a substrate; forming a graphene sheet on a top surface of the substrate in parallel with the substrate; and growing a carbonaceous nanomaterial on another surface of the graphene sheet, the nanomaterial having an aspect ratio of 2 to 75,000 to make a predetermined angle with the graphene sheet.

In another general aspect, the present disclosure provides an electrode for a battery fabricated using the carbonaceous nanocomposite.

In another general aspect, the present disclosure provides a field emission display fabricated using the carbonaceous nanocomposite.

Advantageous Effects

The carbonaceous nanocomposite according to the present disclosure has excellent adhesivity to the substrate and can be attached to the substrate without undergoing a pasting process. Since a two-directional current flow is generated, the electrical resistance of the graphene and carbon nanotube is considerably reduced. In addition, the graphene allows the carbon nanotube to have a high current density and a high specific surface area, thereby accelerating a redox reaction. The excellent heat-radiating property of the graphene sheet allows fast transfer of heat generated in the carbon nanotube to outside, thereby avoiding degradation of the carbon nanotube. Thus, when employed as an electrode for a battery or a field emission display, a higher current density and an extended lifespan can be achieved when compared with the existing art.

BEST MODE

The present disclosure provides a carbonaceous nanocomposite comprising: a substrate; a graphene sheet formed on a top surface of the substrate in parallel with the substrate; and a carbonaceous nanomaterial provided on another surface of the graphene sheet, the nanomaterial having an aspect ratio of 2 to 75,000 to make a predetermined angle with the graphene sheet.

Figure 1:
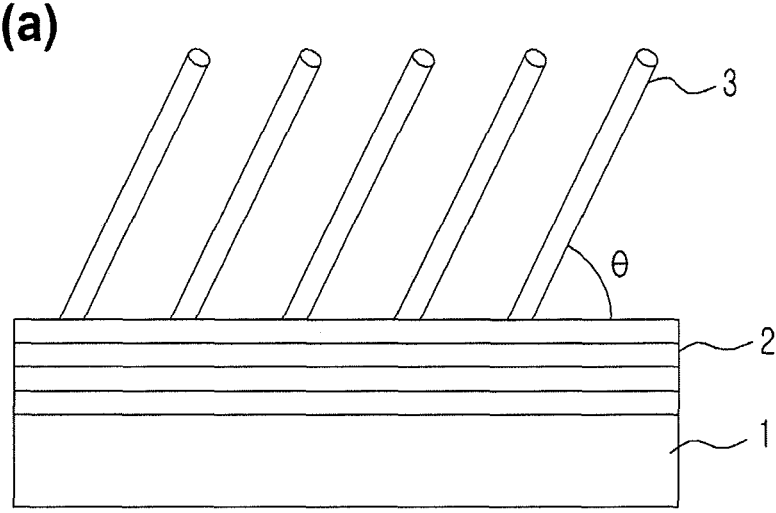
FIGS. 1 (a) and (b) show structures of a carbonaceous nanocomposite according to the present disclosure.
Figure 1:
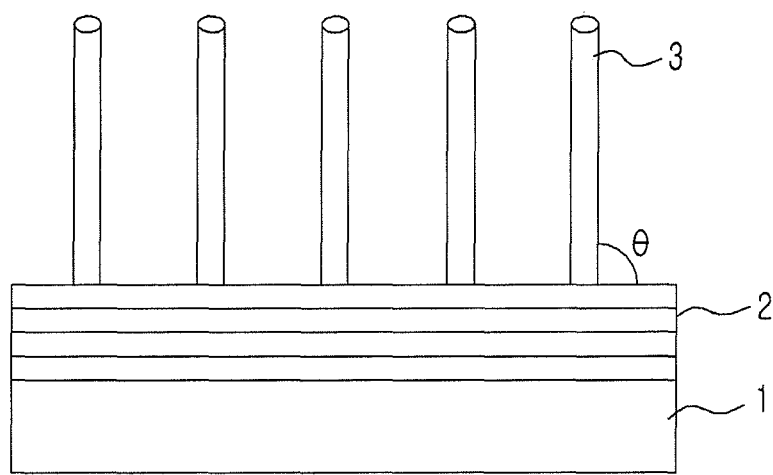

FIGS. 1 (a) and (b) show structures of a carbonaceous nanocomposite according to the present disclosure. Referring to FIGS. 1 (a) and (b), graphene 2 is formed on a substrate 1 in in parallel with the substrate 1, and a carbonaceous nanomaterial 3 is formed to make a predetermined angle θ with the substrate 1 and the graphene 2. The angle θ is smaller than 90° in FIG. 1 (a), and the angle θ is 90° in FIG. 1 (b). Preferably, the angle θ is 90° as in in FIG. 1 (b).

When the carbonaceous nanomaterial is grown on the substrate, it has weak adhesivity to the substrate. The adhesivity of the carbonaceous nanomaterial to the substrate depends on the van der Waals force which is in proportion to the area of contact. Accordingly, the carbonaceous nanomaterial is weakly bonded to the substrate since its diameter is only several to hundreds of nanometers. In order to provide improved adhesion between the carbonaceous nanomaterial and the substrate, the inventors of the present disclosure have increased the area of contact with the substrate.

In accordance with the present disclosure, the adhesion to the substrate is improved by the graphene having a 2-dimensional planar structure. The improved adhesion to the substrate provides advantages in manufacturing process since the attachment process can be omitted.

The 'attachment' process refers to a process of preparing a carbonaceous nanomaterial paste composition of carbon nanotube or carbon nanowire, coating it on a substrate, and drying and baking the same to fabricate a device using the carbonaceous nanomaterial. A binder is used to prepare the paste composition. When the binder remains as residual carbon after the baking, it acts as resistor and greatly degrades the electrical properties of the device.

Further, as the carbonaceous nanomaterial is coated using the paste composition, the electrical properties may be considerably degraded owing to random horizontal arrangement of the nanomaterial. The present disclosure can solve the electrical resistance problem caused by the residual carbon by avoiding use of the binder. In addition, since the process of coating the paste composition can be omitted, the carbonaceous nanomaterial may be fully utilized without the degradation of electrical properties caused by the random arrangement of the carbonaceous nanomaterial.

In the present disclosure, the graphene may be formed on the substrate via direct growth or chemical synthesis.

Graphene may be directly grown by plasma CVD, arc CVD, thermal CVD, or the like. Highly pure graphene without impurities can be obtained using a catalytic metal. Also, the number of the layers of the graphene sheet can be controlled to some extent with the thickness of the catalytic layer. In an exemplary embodiment of the present disclosure, graphene may be grown on a catalytic metal by thermal CVD and then the catalytic metal may be removed by dissolving with a solvent.

Alternatively, graphene may be chemically synthesized according to the Hummers' method reported in 1958. Graphite is chemically treated to obtain an aqueous solution of graphene oxide (GO) and the oxide layer is removed from the aqueous solution to obtain a large quantity of stabilized aqueous solution of graphene. This method allows for easy synthesis of a large quantity of graphene, which can be stored relatively stable as aqueous solution.

Specifically, the graphene sheet may have a thickness of 2-100 nm. When the thickness of the graphene sheet is smaller than 2 nm, the thickness of one graphene layer becomes smaller than the minimum allowed thickness (1.1-1.8 nm). And, when it exceeds 100 nm, properties of bulk graphite will dominate.

The graphene sheet may be in the form of a thin film comprising not only a single layer but also 2-50 layers. When the graphene sheet comprises more than 50 layers, the graphene layer may be too thick as compared to the carbon nanotube layer. When the graphene sheet comprises a single layer, one 2D peak occurs around 2700 $cm^{-1}$ in the Raman spectrum. As the number of the layers increases, the 2D peak is shifted rightward and a strong shoulder peak occurs at the left side. Thus, the number of graphene layers can be estimated from the Raman spectrum.

After the graphene is formed, the carbonaceous nanomaterial is grown to make a predetermined angle with the graphene. The carbonaceous nanomaterial may be grown via direct growth or chemical synthesis.

The carbonaceous nanomaterial may be directly grown on the graphene thin film by vapor deposition or liquid coating of a catalytic metal. Then, the carbonaceous nanomaterial is grown by chemical vapor deposition (CVD) or other appropriate method. Specifically, the catalytic metal may be one or more metal selected from Ni, Co, Fe, Pt, Au, Al, Cr, Cu, Mg, Mn, Rh, Si, Ti, W, U, Zr and alloys thereof. More specifically, Fe, Pt, Au, etc. with good electrical conductivity may be used.

Alternatively, the carbonaceous nanomaterial may be chemically synthesized by mixing graphene oxide or graphene thin film with a catalytic metal adequate for the growth of the carbonaceous nanomaterial in a solvent, coating the resulting mixture on a substrate with appropriate concentration and then drying the same.

The carbonaceous nanomaterial may be formed by dip coating a silicon wafer substrate on which graphene is formed in an Fe/Mo solution. The Fe/Mo solution serves as a catalyst for forming the carbonaceous nanomaterial. The Fe/Mo solution may be mixed with graphene oxide before the graphene is formed and then coated on the substrate. The substrate may be, for example, a substrate wherein carbon is incorporated. Specifically, it may be a SUS substrate.

As another chemical synthesis method, the carbonaceous nanomaterial may be formed by forming a graphene oxide layer on a substrate and etching a catalytic metal film. Specifically, the catalytic metal film may be formed on the graphene oxide layer to a thickness of several to hundreds of nanometers, more specifically 2-10 nm, by thermal deposition, electron beam vapor deposition or sputtering. The catalytic metal film may comprise the same metal used in the direct growth method. Subsequently, the catalytic metal film is etched to form independently isolated nano-sized catalytic metal particles. The isolated nano-sized catalytic metal particles may be formed via gas etching involving pyrolyzing one or more etching gas selected from ammonia gas, hydrogen gas and hydride gas or via plasma etching using a plasma of the etching gas.

The graphene thin film, which serves to improve adhesivity to the substrate, has a 2-dimensional planar structure. In the graphene, electrons move is horizontal direction and thus current flow occurs in the horizontal direction. In the carbonaceous nanomaterial such as carbon nanotube, carbon nanowire, etc. thereabove, electrons move in a direction with a predetermined angle from the graphene sheet and thus current flow occurs in a different direction from that of the graphene sheet. When an electric current is applied to the graphene thin film from an external circuit, no loss of resistance occurs at the interface with the carbonaceous nanomaterial since electrons can move without loss of resistance. And, when the graphene is formed to have a predetermined angle, a larger specific surface area can be obtained as compared to when the attachment process is employed. Accordingly, better electrical properties can be achieved in various applications.

In the present disclosure, the carbonaceous nanomaterial may be a nanomaterial with a linear shape having an aspect ratio of 2 to 75,000. When the aspect ratio is smaller than 2, the efficiency as an electron-emitting source may decrease. And, when the aspect ratio is 75,000 or larger, the thickness of the field emission display increases.

The carbonaceous nanomaterial is formed to make a predetermined angle θ with the graphene sheet. The 'predetermined angle θ' may be any angle exceeding 0°. The angle may be 5-90°, specifically 30-90°, more specifically 60-90°, most specifically 90°, i.e. perpendicular to the graphene sheet.

The carbonaceous nanomaterial may have a length of 1-150 μm and a diameter of 2-500 nm. It may be in the form of a hollow tube or a filled fiber. When the diameter is smaller than 2 nm, the carbonaceous nanomaterial may not have a uniform diameter and electrode properties may degrade. And, when the diameter is larger than 500 nm, the electron-emitting efficiency may be decreased owing to low aspect ratio.

The carbonaceous nanomaterial may be carbon nanotube, carbon nanowire, carbon nanofiber, etc., but is not limited thereto. When the carbonaceous nanomaterial is a carbon nanotube, it may have a diameter of 2-100 nm. The carbon nanotube may be a single-, double- or multi-walled carbon nanotube and may be formed in bundles. When formed in bundles, the carbon nanotube may exhibit high current density during the emission of electrons.

Whereas the existing method of coating a paste composition and drying and baking the same at high temperature is not applicable to most transparent conductive substrates, the method according to the present disclosure can be selectively conducted at temperature ranges where electrical conductivity of the transparent conductive substrate is maintained. In particular, since not only the glass, Si or SUS substrate but also the plastic substrate may be used, it may be utilized to fabricate a flexible device. It is also applicable to an insulating substrate such as glass on which an ITO thin film is formed to confer conductivity.

In an exemplary embodiment of the present disclosure, carbon may be incorporated in the substrate to improve adhesivity. The carbon incorporated in the substrate forms a carbon layer between the substrate and graphene, so that a covalent bonding is formed between the carbon layer and the graphene. Specifically, the substrate may be an SUS substrate.

For example, after graphene sheet or graphene oxide is coated on an SUS substrate wherein carbon is incorporated, the SUS substrate may be heated to grow the carbonaceous nanomaterial, which may be a multi-walled carbon nanotube or carbon nanowire. As the substrate is heated, adhesivity is improved due to the binding between the carbon on the surface of the SUS substrate and the graphene.

The present disclosure also provides a method for fabricating a carbonaceous nanocomposite, comprising: providing a substrate; forming a graphene sheet on a top surface of the substrate in parallel with the substrate; and growing a carbonaceous nanomaterial on another surface of the graphene sheet, the nanomaterial having an aspect ratio of 2 to 75,000 to make a predetermined angle with the graphene sheet.

The present disclosure further provides an electrode for a battery fabricated using the carbonaceous nanocomposite. The electrode may be used for a variety of batteries, including a solar cell, a fuel cell, a secondary battery, etc. The carbonaceous nanocomposite having a novel structure according to the present disclosure can improve the energy conversion efficiency of the electrode for a battery as compared to the existing carbonaceous nanomaterial, since current flow is generated in two directions, i.e. in a horizontal direction and a direction with a predetermined angle from the horizontal direction.

The solar cell may be a silicon solar cell, a dye-sensitized solar cell, a CIGS solar cell, or the like. When used for an electrode for a solar cell, the carbonaceous nanocomposite according to the present disclosure may provide improved energy conversion efficiency.

The fuel cell may be classified into alkaline, phosphoric acid, molten carbonate, solid oxide and solid polymer electrolyte fuel cells according to the electrolyte used. Among them, alkaline, phosphoric acid and solid polymer electrolyte fuel cells require the platinum catalyst. The carbonaceous nanocomposite according to the present disclosure may be employed in an electrode for the alkaline, phosphoric acid and solid polymer electrolyte fuel cells. Also, the carbonaceous nanocomposite may be used in the direct methanol fuel cell because it has the same structure as the solid polymer electrolyte fuel cell.

The present disclosure further provides a field emission display fabricated using the carbonaceous nanocomposite. A field emission display using carbon nanotube as a source of electron emission is already known. However, after pasting of the carbon nanotube followed by baking activation, the field emission display exhibits lower field emission effect than expected. The carbonaceous nanocomposite according to the present disclosure can solve this problem and improve the field emission effect.

Unlike the existing carbonaceous nanomaterial where electron transport and field emission occur concurrently, transport of electrons and heat occurs in the horizontal direction and field emission occurs in the direction with a specific angle from the horizontal direction, in the carbonaceous nanocomposite of the present disclosure. As a consequence, the heat generated during the operation of the device can be quickly transferred outward by the graphene and thus the reduction of device lifespan can be prevented.

Mode for Invention

The examples and experiments will now be described. The following examples and experiments are for illustrative purposes only and not intended to limit the scope of the present disclosure.

Preparation of Graphene Sheet

Example 1

A silicon wafer was organically washed and an Fe catalyst was deposited to a thickness of 100 nm by RF ion sputtering. Then, the wafer was heated at 900° C. for 30 minutes at a pressure of 60 torr while flowing Ar gas at 500 sccm. After keeping at 900° C. for 5 minutes, carbon nanotube was grown for 10 minutes while flowing methane gas at 25 sccm. Then, several layers of graphene were grown on the silicon wafer by cooling for 50 minutes while flowing hydrogen gas at 500 sccm.

Example 2

A vial was placed on a hot plate and, after adding $H_2SO_4$ (6 mL), heated to 80° C. After weighing and slowly adding $K_2S_2O_8$ and $P_2O_5$ (2 g), graphite powder (4 g) was added. When deep blue color was developed, the reaction mixture was cooled at room temperature (25° C.) for 6 hours. Then, the graphite powder was filtered using filter paper. The filtered graphite powder was washed with deionized water until pH 7.

After filtration and washing, the graphite powder was dried overnight at room temperature (25° C.) to obtain graphite oxide (GO). An ice box containing a Teflon beaker, ice and salt was placed on a mechanical stirrer. Then, saturated $H_2SO_4$ (92 mL) and the graphite oxide were added to the Teflon beaker.

$KMnO_4$ (12 g) was slowly added while keeping the temperature inside the Teflon beaker at 20° C. or lower. When the reaction became stable after the addition of $KMnO_4$, the mixture was stirred at 35° C. for 2 hours. Then, deionized water (185 mL) was slowly added. 15 minutes later, deionized water (560 mL) and 30% $H_2O_2$ (10 mL) were added. After filtering the graphite oxide, metal ions attached to the graphite oxide were removed by slowly pouring a 10:1 solution of deionized water and HCl (1 L). The graphite oxide remaining on the filter paper was added to deionized water (800 mL). After filtering the graphite oxide with dialysis membrane, 0.5% w/v graphite oxide was obtained. After sonication (500 W 30%) for 30 minutes, unpeeled graphite oxide was removed by centrifugation at 3,000 rpm for 30 minutes. A graphene oxide sheet comprising several layers was obtained.

Example 3

Experiment was carried out in the same manner as in Example 2, except for dip coating a substrate in a graphite oxide solution, heating in a furnace at 300° C. for 5 hours and reducing oxygen by annealing to prepare graphene, in order to remove oxide groups from graphite oxide.

Example 4

Experiment was carried out in the same manner as in Example 2, except for adding a graphene solution (5 mL), deionized water (5 mL), hydrazine (35 wt %, 5 μL) and ammonia (28 wt %, 35 μL) to a vial, vigorously stirring for several minutes and keeping in water at 95° C. for about 1 hour to prepare 1.75 wt % graphene (chemically converted graphene). A substrate was dip coated in the resulting graphene solution to coat several layers of graphene on the substrate.

Fabrication of Carbonaceous Nanocomposite

Example 5

Fe (6 nm) was deposited on the silicon wafer substrate on which graphene was formed in Example 1, 3 or 4 by ion sputtering. Then, the substrate was heated by CVD at 900° C. for 30 minutes at a pressure of 60 torr while flowing Ar and $NH_3$ gas at 1000 and 140 sccm, respectively. After increasing pressure to 700 torr and keeping at 900° C. for 5 minutes, carbon nanotube was grown for 10 minutes while flowing $C_2H_2$ gas at 20 sccm. Then, a carbonaceous nanocomposite was fabricated by cooling for 50 minutes while flowing argon gas at 1000 sccm.

Comparative Example 1

A silicon wafer was organically washed and a Fe catalyst was deposited to a thickness of 100 nm by RF ion sputtering. Then, the wafer was heated at 900° C. for 30 minutes at a pressure of 60 torr while flowing Ar gas at 500 sccm. several layers of graphene were grown on the silicon wafer by cooling for 50 minutes while flowing hydrogen gas at 500 sccm.

Comparative Example 2

Multi-walled carbon nanotube (MWCNT) was grown on an Si substrate by thermal chemical vapor deposition (CVD). The grown MWCNT was scraped away from the substrate using a knife.

A binder was prepared by mixing carboxymethyl cellulose (CMC) with deionized (DI) water at 1:500. After mixing the MWCNT in the binder, MWCNT paste was prepared by sonicating for about 1 hour.

An MWCNT electrode was prepared by coating the MWCNT paste on an FTO substrate by doctor blading. Thus formed MWCNT electrode was patterned to have an area of about 0.3 cm² using 3M tape. After releasing the 3M tape, the electrode was dried at room temperature for about 5 hours.

Test of Carbonaceous Nanocomposite

Figure 2:
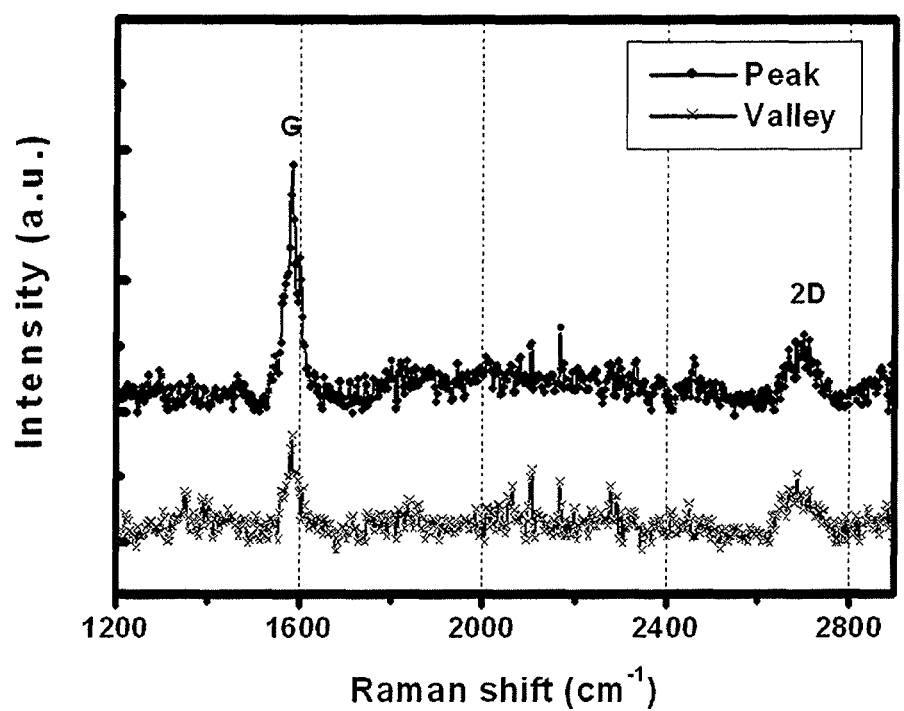
FIG. 2 shows a Raman spectrum of a graphene sample prepared according to the present disclosure.

FIG. 2 shows a Raman spectrum of the graphene sample synthesized in Example 2 in the range of 1200-3000 cm$^{-1}$. An argon (Ar) ion laser of 514.4 nm was used for the measurement. In general, a Raman spectrum (514.5 nm) of graphite consists of a G-band around 1580 (±20) cm$^{-1}$ and a D-band around 1350 (±10) cm$^{-1}$ corresponding to defect or disorder characteristics. In particular, graphene exhibits a 2D-band around 2700 (±5) cm$^{-1}$, i.e. two times that of the D-band, owing to double resonance. This band is important in the analysis of a graphene sample consisting of multiple layers since it occurs owing to the interference between each layer of the graphene.

Figure 3:
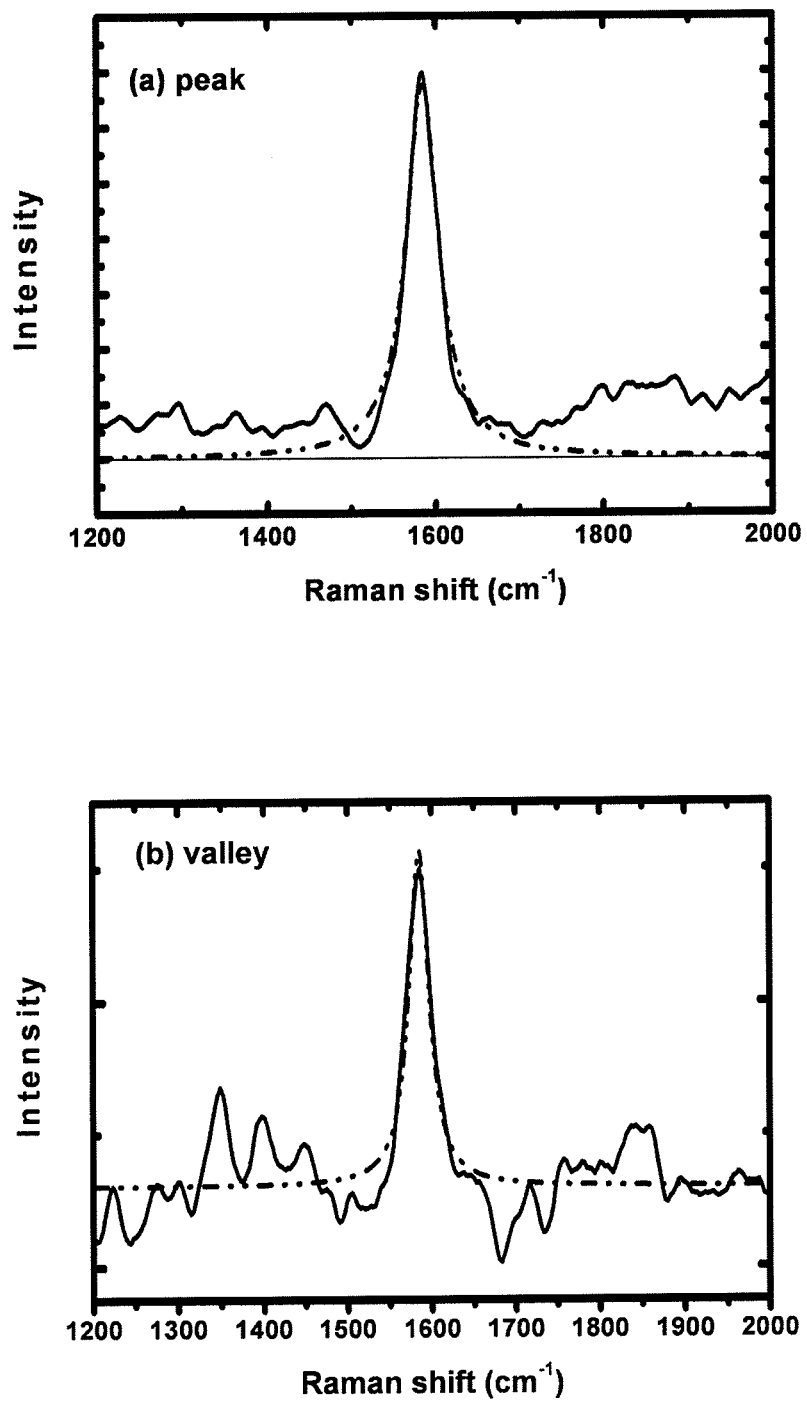
FIG. 3 shows a result of fitting the G-band spectrum of the Raman spectrum shown in FIG. 2.

FIG. 3 shows a result of fitting the G-band spectrum of the Raman spectrum shown in FIG. 2. The Raman spectrum of pure graphite is characterized by (leftward) redshift near 1580 cm$^{-1}$ and (rightward) blueshift near 2700 cm$^{-1}$. Meanwhile, the Raman spectrum of pure graphene is characterized by (rightward) blueshift near 1580 cm$^{-1}$ and (leftward) redshift near 2700 cm$^{-1}$.

Figure 4:
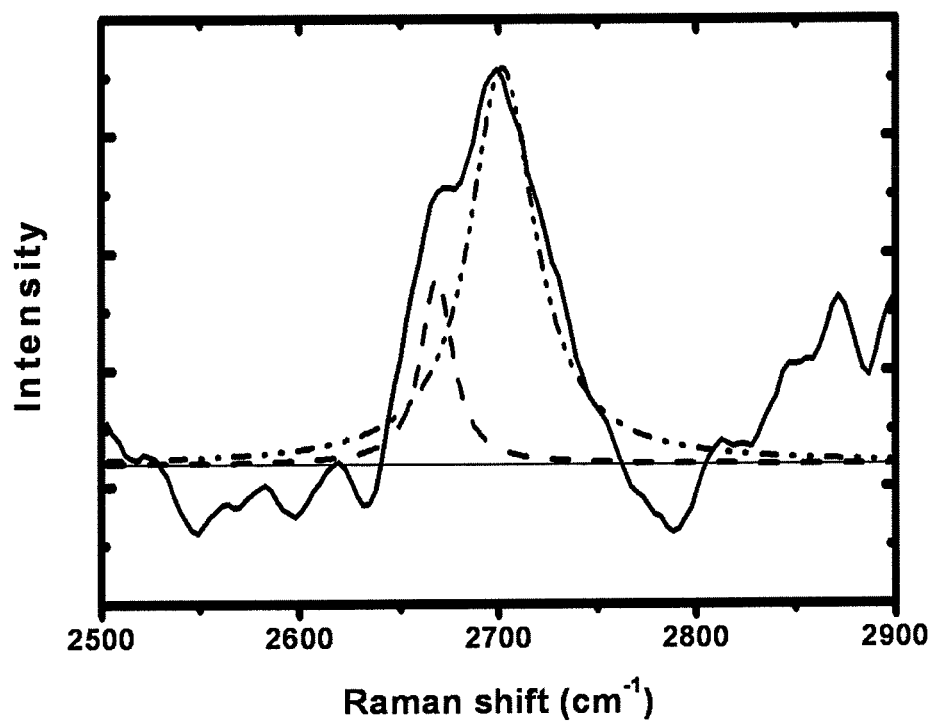
FIG. 4 shows a result of fitting the 2D-band spectrum of the Raman spectrum shown in FIG. 2 and comparing the number of graphene layers.

FIG. 4 shows a result of fitting the 2D-band spectrum of the Raman spectrum shown in FIG. 2 (a) and comparing the number of graphene layers (b). It is known that the thickness of the graphene layer can be determined from the relative intensities of the G-band and the 2D-band [A. C Ferrari, *PRL* 97, 187401 (2006)]. Since the ratio of the intensities of the G-band and the 2D band is larger in the peak portion than that in the valley portion, it can be seen that the graphene layer was formed thickly. Since the D-band is not observed near 1350 cm$^{-1}$ in the Raman spectrum of graphene, the presence or absence of graphene can be determined.

In general, the 2D peak occurs near 2700 cm$^{-1}$. When the graphene consists of a single layer, one strong peak is observed. As the number of the graphene layers increases, the 2D peak is shifted rightward and a strong shoulder peak occurs at the left side. Thus, the number of graphene layers can be estimated from the Raman spectrum.

The Raman spectrum shows two overlapped peaks at 2668 cm$^{-1}$ and 2702 cm$^{-1}$. It can be seen that full width at half maximum (FWHM: 68) and intensity of the peak occurring at 2702 cm$^{-1}$ are about 2 times those of the peak occurring at 2668 cm$^{-1}$. Referring to FIG. 4 (b), the shoulder peak of the Raman spectrum of the synthesized graphene looks similar to that of the graphene consisting of 2 to 5 layers. However, since no 2D-band peak shift is observed near 2700 cm$^{-1}$, it can be concluded that the graphene sheet consists of 2 to 4 layers.

Figure 5:
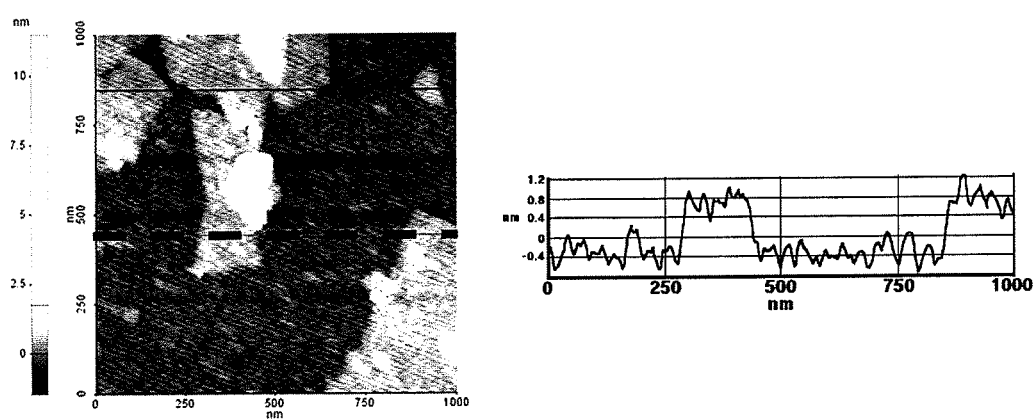
FIG. 5 shows an AFM image of graphene formed according to the present disclosure and a thickness thereof.

FIG. 5 shows an AFM image of graphene formed according to the present disclosure and a thickness thereof. Referring to FIG. 5, the graphs on the right show the thickness of graphene measured at two portions. The thickness is measured to be about 2-6 nm.

Figure 6:
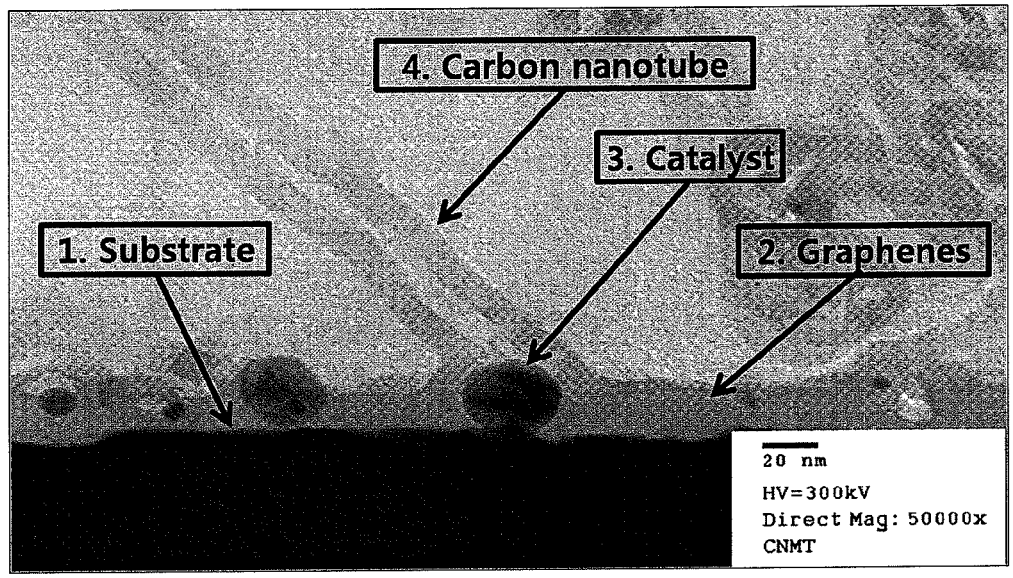
FIG. 6 shows a TEM image of a carbonaceous nanocomposite fabricated according to the present disclosure.
Figure 6:
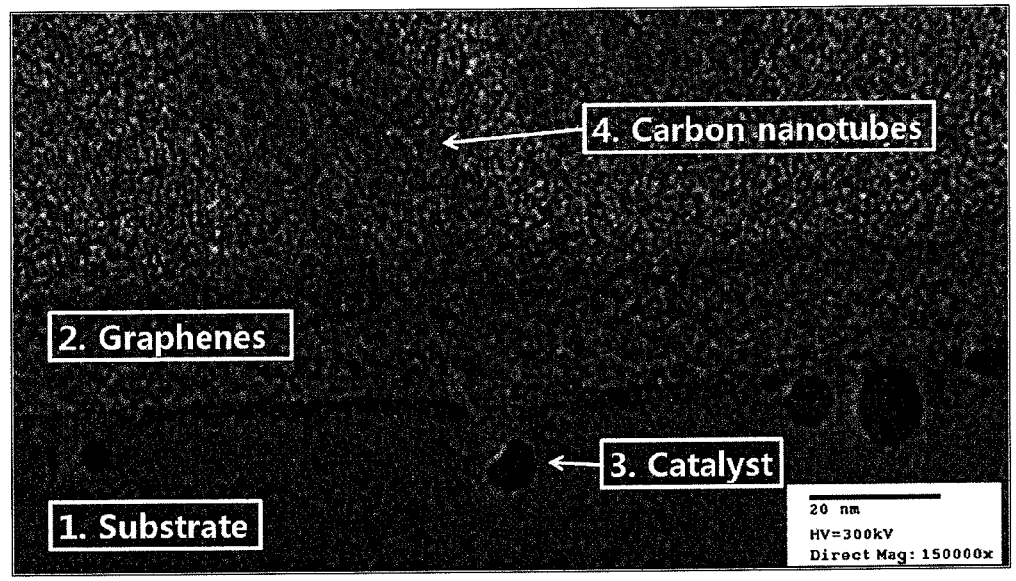

FIG. 6 shows a TEM image of a carbonaceous nanocomposite fabricated according to the present disclosure. Referring to FIG. 6, it can be confirmed that graphene was formed on the $SiO_2$ substrate in Example 2 and that multi-walled carbon nanotube was formed on the graphene.

Figure 7:
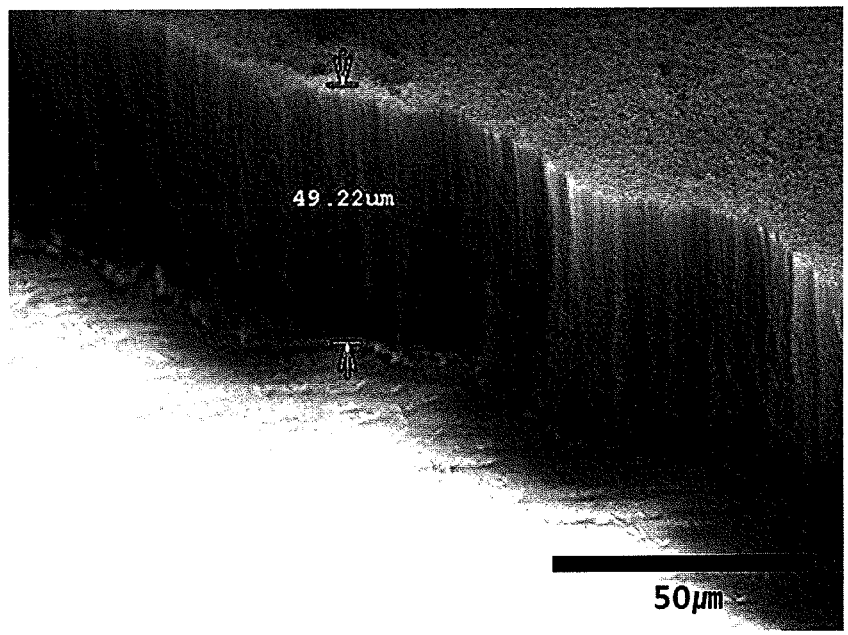
FIG. 7 shows an SEM image of a carbonaceous nanocomposite fabricated according to the present disclosure.
Figure 7:
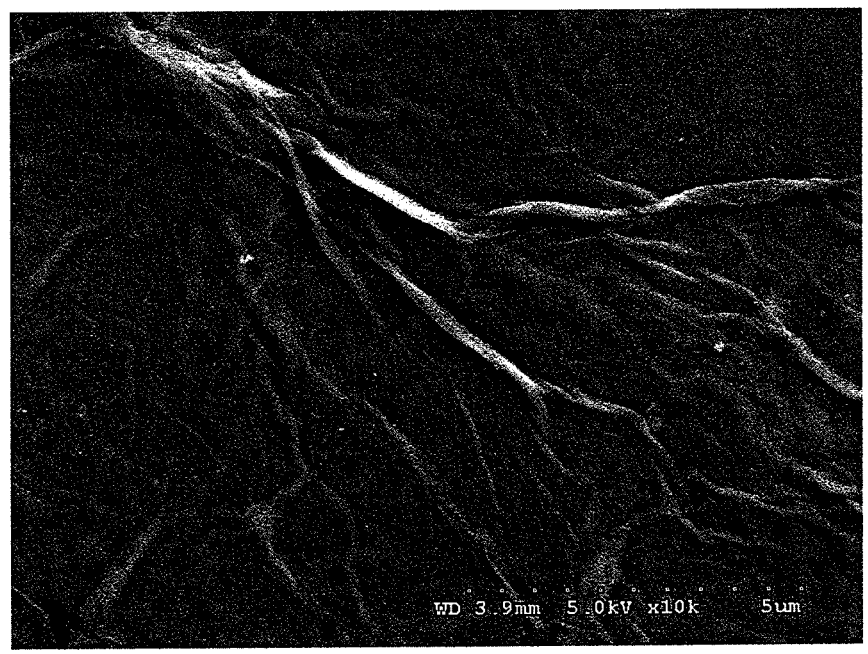

FIG. 7 shows an SEM image of a carbonaceous nanocomposite (MWCNT) fabricated according to the present disclosure. Referring to FIG. 7, it can be confirmed that MWCNT is formed densely.

Fabrication of Dye-Sensitized Solar Cell (DSSC)

In order to fabricate a transparent dye-sensitized solar cell, a paste comprising the carbonaceous nanocomposite of Example 5 or Comparative Example 1 or 2 was prepared. A titanium oxide layer and the paste comprising the carbonaceous nanocomposite of Example 5 or Comparative Example 1 or 2 were coated on an FTO glass substrate cut to a size of 15 mm×10 mm while increasing temperature from room temperature to 400° C. An electrolyte (I$^-$/I3$^-$ (N719: Solaronix, Switzerland))-coated electrode substrate was attached to the carbonaceous nanocomposite-coated electrode substrate on the dye-adsorbed titanium oxide to fabricate a dye-sensitized solar cell.

Polarization Resistance of DSSC

Figure 8:
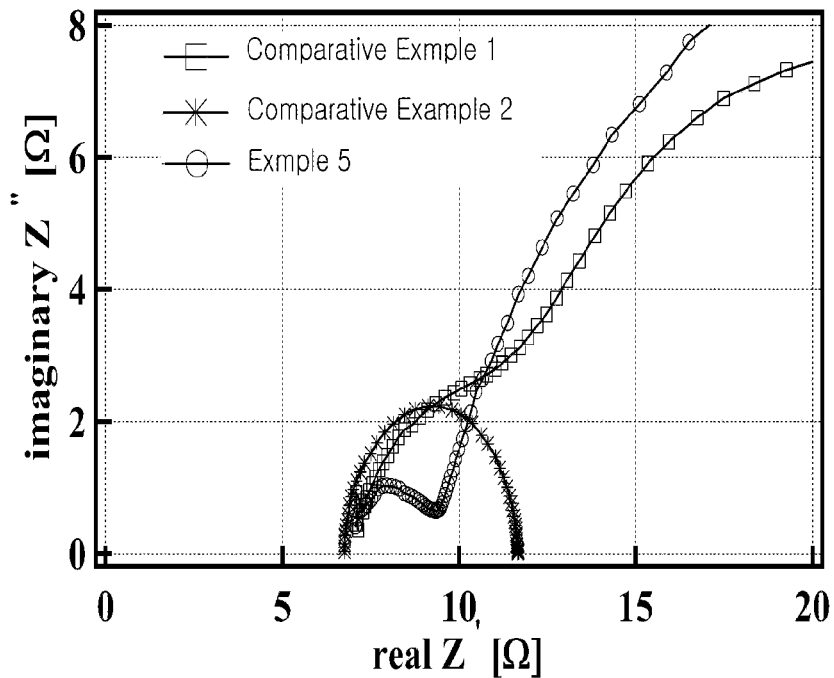
FIG. 8 shows Nyquist data for the electrochemical reaction of a counter electrode of a dye-sensitized solar cell (DSSC).

FIG. 8 shows Nyquist data for the electrochemical reaction of a counter electrode of the DSSC measured using a half cell. Referring to FIG. 8, the electrolyte resistance ($R_s$) value is the same as 6.8-7.0Ω since the electrolyte I$^-$/I3$^-$ (N719: Solaronix, Switzerland) and the cell area were the same. The polarization resistance ($R_p$) value, representing the resistance between the counter electrode and the electrolyte, was in the order of Example 5<Comparative Example 2<Comparative Example 1. The polarization resistance of Example 5, which showed the lowest value, was very low as 2.5 D. Accordingly, it can be seen that the electrochemical reaction occurred most actively in Example 5.

As for Comparative Example 1 (graphene), the resistance was high because the area for reaction was not sufficient when compared to Example 5. This reveals that, although graphene is known to have better electrical conductivity than multi-walled carbon nanotube, the charge transport property is more affected by structure than the material property.

In addition, the electrical conductivity and other electrical properties of directly grown multi-walled carbon nanotube are degraded severely owing to the residual carbon remaining on the substrate surface after baking. And, in most cases, rapid degradation of electrochemical properties is observed due to random horizontal arrangement. In contrast, the carbonaceous nanocomposite fabricated without using the binder exhibits a large area for reaction and decreased electrical resistance since the vertical arrangement is maintained.

Frequency Range of DSSC

Figure 9:
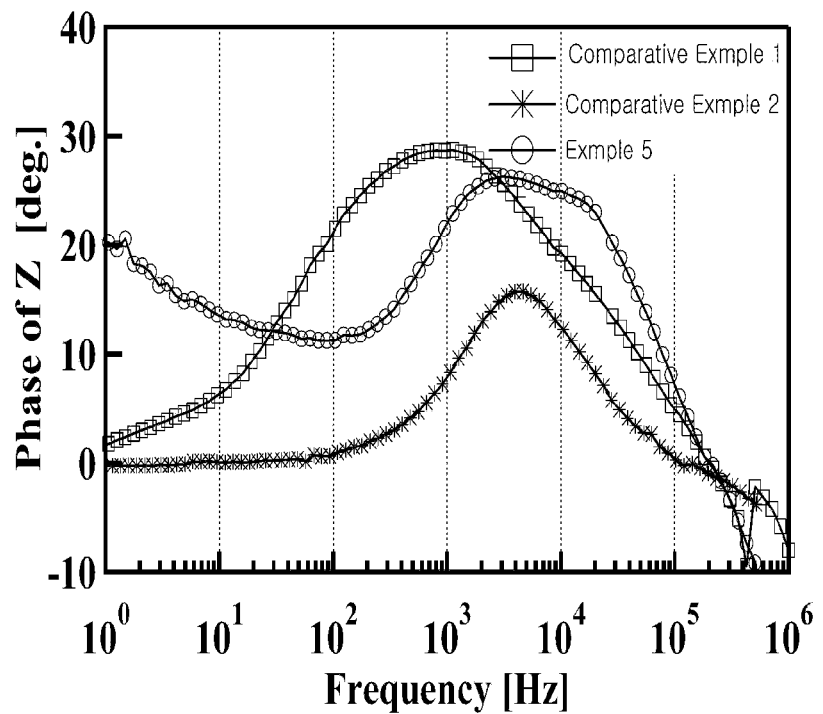
FIG. 9 shows Bode plots depending on electrode type.

FIG. 9 shows Bode plots depending on electrode type. Referring to FIG. 9, the main response frequency range of Comparative Example 1 (graphene) is around 1000 Hz, meaning that the response speed is slow. The response frequency range was about 1000-20000 Hz for Comparative Example 2 (MWCNT) and 500-50000 Hz for Example 5. Thus, it can be seen that the electrochemical reaction occurs faster in the GMWCNT.

It is known that reaction occurs more actively at the tip than on the side of carbon nanotube. Accordingly, the structure of the present disclosure with the arrangement having a predetermined angle maintained exhibits better frequency properties than the multi-walled carbon nanotube having random horizontal arrangement, since the tip portion of the carbon nanotube is mostly exposed to the electrolyte.

Performance of DSSC

Figure 10:
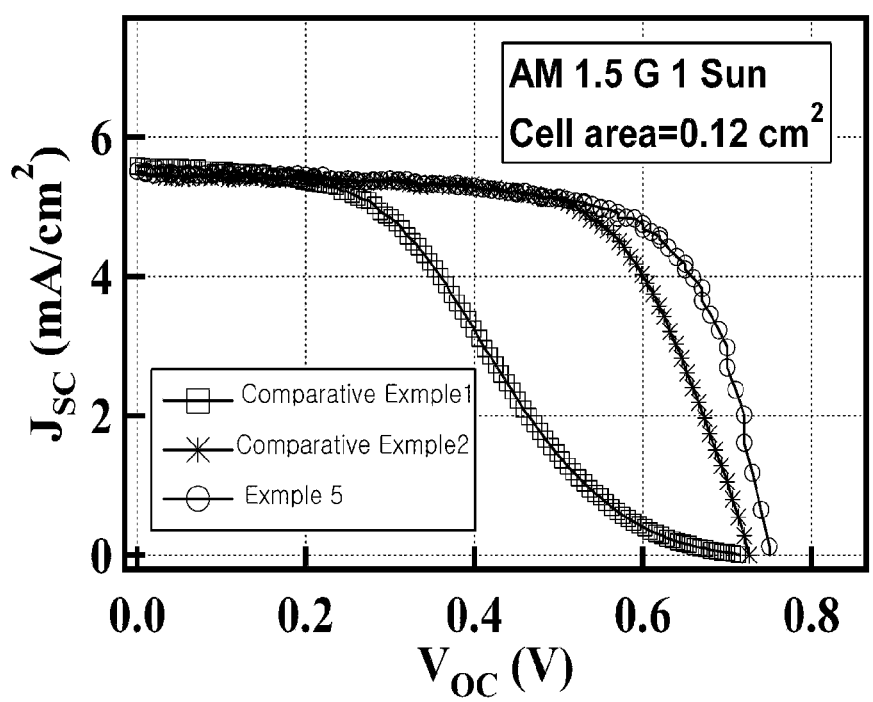
FIG. 10 shows I-V curves for a counter electrode of a dye-sensitized solar cell (DSSC) fabricated according to the present disclosure.

FIG. 10 shows I-V curves for a counter electrode of the DSSC fabricated using the carbon material of Example 5 or Comparative Example 1 or 2 and the same electrolyte I$^-$/I3$^-$ (N719) and cell area, measured under the condition of 1 sun and AM 1.5. The result of measuring $J_{sc}$, $V_{oc}$, fill factor and energy conversion efficiency is given in Table 1.

TABLE 1

| | $J_{sc}$ (mA/cm$^2$) | $V_{oc}$ (V) | Fill factor | η (%) |
|---|---|---|---|---|
| Example 5 | 5.6 | 0.76 | 0.70 | 3.0 |
| Comparative Example 1 | 5.6 | 0.71 | 0.37 | 1.5 |
| Comparative Example 2 | 5.5 | 0.74 | 0.65 | 2.6 |

The result shown in Table 1 is consistent with the Nyquist data and the Bode plot shown above. That is to say, the performance of the DSSC is in the order of graphene<MWCNT<GMWCNT. The fill factor has a great effect on the efficiency of the DSSC since it significantly affects the electrochemical reaction in the DSSC, although other factors such as the condition of total internal reflection, material of each portion, etc. are also relevant. The fill factor of the GMWCNT cell, 0.7, was identical to that of the Sharp's DSSC using platinum, which exhibited an efficiency of 10.2%. Accordingly, the carbonaceous nanocomposite of the present disclosure may replace platinum.

The DSSC used for the test had a TiO$_2$ layer with a thickness of about 7 μm, where light is totally reflected. If the thickness is changed to 12-13 μm, the light incident on the dye will increase by at least about 25% and hence the efficiency will be further improved.

In addition, the $J_{sc}$ value was measured to be low owing to the resistance of the substrate, since the area of the FTO substrate was 3.6 cm$^2$ whereas that of the TiO$_2$ layer was 0.12 cm$^2$. Considering that the area ratio of the TiO$_2$ layer and the substrate is 0.25-0.36 in most literatures whereas it is 0.03 in the present test, much better efficiency may be achievable simply by modifying the two design factors.

The invention claimed is:

1. A carbonaceous nanocomposite comprising:
    a substrate, wherein the substrate is a SUS substrate that incorporates carbon;
    a graphene sheet formed on the substrate, wherein the graphene sheet has a thickness of 2-100 nm;
    a plurality of first carbonaceous nanomaterials disposed on the graphene sheet, wherein the first carbonaceous nanomaterial has two ends, wherein one end is chemically bonded to a first surface of the graphene sheet facing away from the substrate so that the first carbonaceous nanomaterial is affixed to the graphene sheet at a predetermined angle, wherein the first carbonaceous nanomaterials has an aspect ratio of 2 to 75,000; and
    a plurality of second carbonaceous nanomaterials disposed between the substrate and a second surface of the graphene sheet facing toward the substrate.

2. The carbonaceous nanocomposite of claim 1, wherein the graphene sheet comprises 1-100 layers.

3. The carbonaceous nanocomposite of claim 1, wherein the predetermined angle is 5-90c'.

4. The carbonaceous nanocomposite of claim 1, wherein the first carbonaceous nanomaterial is one or more selected from carbon nanotube, carbon nanowire and carbon nanofiber.

5. The carbonaceous nanocomposite of claim 4, wherein the carbon nanotube is single-, double- or multi-walled carbon nanotube.

6. The carbonaceous nanocomposite of claim 4, wherein the carbon nanotube has a diameter of 2-100 nm.

7. The carbonaceous nanocomposite of claim 1, wherein the first carbonaceous nanomaterial is formed from one or more catalytic metal selected from Ni, Co, Fe, Pt, Au, Al, Cr, Cu, Mg, Mn, Rh, Si, Ti, W, U and Zr.

8. The carbonaceous nanocomposite of claim 1, wherein the second carbonaceous nanomaterial is a multi-walled nanotube and/or a carbon nanowire.

9. An electrode for a battery fabricated using the carbonaceous nanocomposite of claim 1.

10. A solar cell employing the electrode for a battery of claim 9.

11. A field emission display fabricated using the carbonaceous nanocomposite of claim 1.

12. A method for fabricating a carbonaceous nanocomposite, comprising:
    providing a substrate, wherein the substrate is a SUS substrate that incorporates carbon;
    forming a graphene sheet on a surface of the substrate in parallel with the substrate; and
    growing a first carbonaceous nanomaterial on a first surface of the graphene sheet facing away from the substrate, wherein the first carbonaceous nanomaterial has an aspect ratio of 2 to 75,000 and makes a predetermined angle with the graphene sheet; and
    growing a second carbonaceous nanomaterial between the substrate and a second surface of the graphene sheet facing toward the substrate, and
    obtaining the carbonaceous nanocomposite of claim 1.

13. The method for fabricating a carbonaceous nanocomposite according to claim 12, wherein the graphene sheet is directly grown by chemical vapor deposition after depositing a catalytic metal by sputtering.

14. The method for fabricating a carbonaceous nanocomposite according to claim 12, wherein the graphene sheet is formed by preparing graphene oxide and removing oxygen therefrom via heat treatment or chemical treatment.

15. The method for fabricating a carbonaceous nanocomposite according to claim 12, which comprises mixing graphene oxide or the graphene sheet with an Fe/Mo solvent and then coating the mixture on the substrate.

16. The method for fabricating a carbonaceous nanocomposite according to claim 12, wherein the first carbonaceous nanomaterial is one or more selected from carbon nanotube, carbon nanowire and carbon nanofiber.

17. The method for fabricating a carbonaceous nanocomposite according to claim 12, wherein the first carbonaceous nanomaterial is formed by depositing a catalytic metal on the substrate on which the graphene sheet is formed or by immersing the substrate in an aqueous solution of a catalytic metal and then performing chemical vapor deposition.

* * * * *